United States Patent
Kiyota et al.

(10) Patent No.: US 10,167,538 B2
(45) Date of Patent: Jan. 1, 2019

(54) STEEL PIPE

(71) Applicant: NIPPON STEEL & SUMITOMO METAL CORPORATION, Tokyo (JP)

(72) Inventors: Yosuke Kiyota, Tokyo (JP); Takaaki Fukushi, Tokyo (JP); Hideyuki Nakamura, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 200 days.

(21) Appl. No.: 15/108,950

(22) PCT Filed: Feb. 4, 2014

(86) PCT No.: PCT/JP2014/052567
§ 371 (c)(1),
(2) Date: Jun. 29, 2016

(87) PCT Pub. No.: WO2015/118610
PCT Pub. Date: Aug. 13, 2015

(65) Prior Publication Data
US 2016/0319404 A1 Nov. 3, 2016

(51) Int. Cl.
| | | |
|---|---|---|
| *C22C 38/04* | (2006.01) | |
| *C22C 38/38* | (2006.01) | |
| *C21D 9/08* | (2006.01) | |
| *C22C 38/00* | (2006.01) | |
| *C22C 38/12* | (2006.01) | |
| *C22C 38/02* | (2006.01) | |
| *C22C 38/06* | (2006.01) | |
| *C22C 38/14* | (2006.01) | |
| *C22C 38/16* | (2006.01) | |
| *C22C 38/22* | (2006.01) | |
| *C22C 38/24* | (2006.01) | |
| *C22C 38/26* | (2006.01) | |
| *C22C 38/28* | (2006.01) | |
| *C22C 38/32* | (2006.01) | |
| *B23K 11/087* | (2006.01) | |
| *B23K 11/093* | (2006.01) | |
| *C22C 38/08* | (2006.01) | |
| *F16L 9/02* | (2006.01) | |

(52) U.S. Cl.
CPC .......... *C22C 38/38* (2013.01); *B23K 11/0873* (2013.01); *B23K 11/0935* (2013.01); *C21D 9/08* (2013.01); *C22C 38/00* (2013.01); *C22C 38/001* (2013.01); *C22C 38/002* (2013.01); *C22C 38/005* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *C22C 38/16* (2013.01); *C22C 38/22* (2013.01); *C22C 38/24* (2013.01); *C22C 38/26* (2013.01); *C22C 38/28* (2013.01); *C22C 38/32* (2013.01); *F16L 9/02* (2013.01)

(58) Field of Classification Search
CPC ...................................................... C22C 38/04
See application file for complete search history.

(56) References Cited

U.S. PATENT DOCUMENTS

| | | |
|---|---|---|
| 5,192,376 A | 3/1993 | Tanabe et al. |
| 2010/0084892 A1* | 4/2010 | Yoshida .................. B21D 7/08 296/203.02 |
| 2012/0093678 A1 | 4/2012 | Nakamura et al. |
| 2014/0137992 A1 | 5/2014 | Ishiguro et al. |

FOREIGN PATENT DOCUMENTS

| | | |
|---|---|---|
| EP | 2143621 A1 | 1/2010 |
| JP | 62-107023 A | 5/1987 |
| JP | 4-183820 A | 6/1992 |
| JP | 6-088129 A | 3/1994 |
| JP | 2000-178688 A | 6/2000 |
| JP | 2003-103329 A | 4/2003 |
| JP | 2005-330562 A | 12/2005 |
| JP | 2006-037205 A | 2/2006 |
| JP | 2008-063656 A | 3/2008 |
| JP | 2009-155730 A | 7/2009 |
| JP | 2012-167328 A | 9/2012 |
| JP | 2013-032584 A | 2/2013 |

OTHER PUBLICATIONS

International Search Report (PCT/ISA/210) issued in PCT/JP2014/052567, dated Apr. 22, 2014.
Written Opinion (PCT/ISA/237) issued in PCT/JP2014/052567, dated Apr. 22, 2014.
Extended European Search Report dated Jul. 20, 2017, for corresponding European Application No. 14881910.5.
European Office Action dated Jun. 21, 2018, for corresponding European Application No. 14881910.5.

* cited by examiner

*Primary Examiner* — Keith D. Hendricks
*Assistant Examiner* — Jophy S. Koshy
(74) *Attorney, Agent, or Firm* — Birch, Stewart, Kolasch & Birch, LLP

(57) ABSTRACT

A steel pipe, consisting of, in terms of mass %: from 0.06% to 0.25% of C, 0.50% or less of Si, 1.00% to 1.80% of Mn, 0.030% or less of P, 0.020% or less of S, 0.08% or less of Al, 0.008% or less of N, 0.080% or less of Nb, and a remainder consisting of Fe and unavoidable impurities, wherein a compressive residual stress at an outer surface measured by an X-ray method is 250 MPa or more, and a compressive residual stress at a position at a depth of 1 mm from the outer surface measured by the X-ray method is 70% or more of the compressive residual stress at the outer surface measured by the X-ray method.

12 Claims, 1 Drawing Sheet

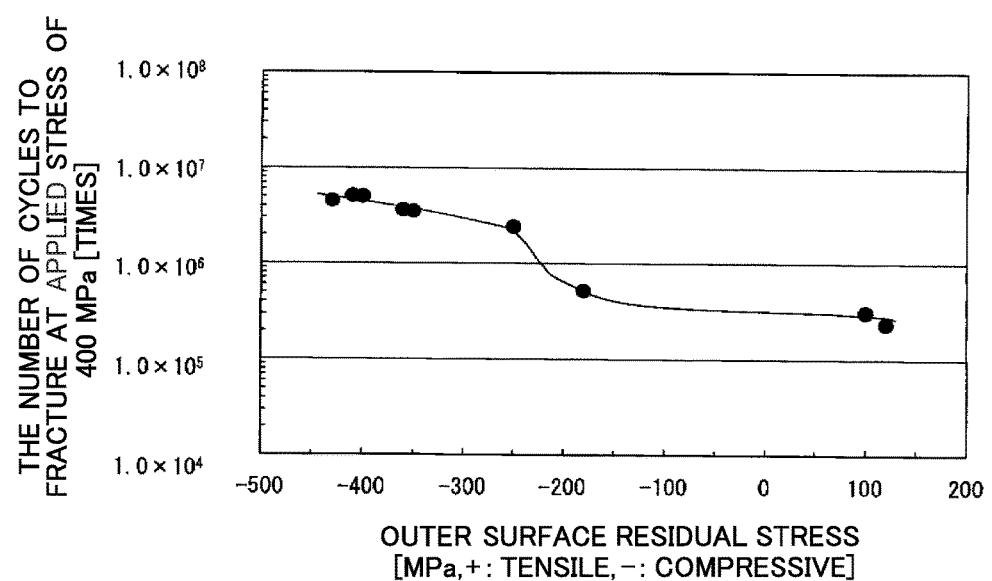

STEEL PIPE

TECHNICAL FIELD

The present invention relates to a steel pipe.

BACKGROUND ART

Repeated application of internal pressure to steel pipes may commonly result in generation of fatigue fractures (hereinafter also referred to as "internal pressure fatigue fractures") in the steel pipes. In order to inhibit such internal pressure fatigue fractures, improvement in the internal pressure fatigue resistance properties of the steel pipes may be demanded.

Hitherto, in order to improve the internal pressure fatigue resistance properties of steel pipes, various technologies have been examined.

For example, as a method of producing a steel pipe for a cylinder tube having excellent internal pressure fatigue resistance properties, a method of producing a steel pipe for a cylinder tube is known in which, in the process of producing a steel pipe for a cylinder tube by drawing a steel pipe, heat treatment is performed at from 300° C. to 350° C. after the drawing (see, for example, Japanese Patent Application Laid-Open (JP-A) No. H4-183820).

In order to improve the fatigue resistance properties of the steel pipes, technologies to reduce residual stress of steel pipes are also known. For example, as a method of producing a steel pipe for a cylinder having reduced residual stress and excellent fatigue strength, a method of producing a steel pipe for a cylinder is known in which both ends of an original steel pipe are chucked, and then the original steel pipe is moved in one direction while rotating the original steel pipe, and then a roll is pushed on a worked portion of the original steel pipe while heating the worked portion to work the original steel pipe so that an outer diameter of the original steel pipe become constant (see, for example, Japanese Patent Application Laid-Open (JP-A) No. 2003-103329).

SUMMARY OF INVENTION

Technical Problem

However, there have been demands to further improve the internal pressure fatigue resistance properties of steel pipes.

In particular, in a steel pipe, a flaw is often imparted from the outside of the steel pipe rather than from the inside of the steel pipe. Therefore, in order to more effectively improve the internal pressure fatigue resistance properties, it is important to inhibit internal pressure fatigue fractures originating from flaws imparted from the outside.

In order to inhibit internal pressure fatigue fractures originating from flaws imparted from the outside, it is effective to increase compressive residual stresses at the outer surface of the steel pipe and in the vicinity of the outer surface.

Examples of methods of increasing compressive residual stress at the outer surface of a steel pipe include methods of performing shot blasting working, burnishing working, and the like with respect to the outer surface of a steel pipe.

However, these methods may be incapable of inhibiting a fatigue fracture originating from a flaw imparted from the outside because it is only the compressive residual stress in a very shallow portion including the outer surface that is increased by these methods. For example, in a case in which an outer surface is removed by cutting or the like of a steel pipe, and a flaw is imparted in a region in which the outer surface is removed, an internal pressure fatigue fracture originating from the flaw is easily generated. In a case in which a flaw having a depth from the outer surface to the inside of the steel pipe is imparted to the steel pipe, an internal pressure fatigue fracture originating from the flaw is also easily generated.

The invention was made under such circumstances with an object of providing a steel pipe having excellent internal pressure fatigue resistance properties.

Solution to Problem

The inventors found that an increase in compressive residual stress not only at the outer surface of a steel pipe but also in the vicinity of the outer surface is effective for improving the internal pressure fatigue resistance properties of the steel pipe, thereby accomplishing the invention.

Namely, specific means for solving these problems are as follows.

<1> A steel pipe, consisting of, in terms of mass %:
0.06% to 0.25% of C,
0.50% or less of Si,
1.00% to 1.80% of Mn,
0.030% or less of P,
0.020% or less of S,
0.08% or less of Al,
0.008% or less of N,
0.080% or less of Nb, and
a remainder consisting of Fe and unavoidable impurities,
in which a compressive residual stress at an outer surface measured by an X-ray method is 250 MPa or more, and
a compressive residual stress at a position at a depth of 1 mm from the outer surface measured by the X-ray method is 70% or more of the compressive residual stress at the outer surface measured by the X-ray method.

<2> The steel pipe according to <1>, further comprising, in terms of mass %, one or more of:
0.080% or less of V,
0.030% or less of Ti,
0.50% or less of Cu,
0.50% or less of Ni,
0.50% or less of Cr,
0.50% or less of Mo,
0.0040% or less of B,
0.005% or less of Ca, or
0.005% or less of REM.

<3> The steel pipe according to <1> or <2>, having a wall thickness of from 7 mm to 17 mm, in which a ratio of the wall thickness to an outer diameter (wall thickness/outer diameter) is from 0.07 to 0.12.

<4> The steel pipe according to any one of <1> to <3>, in which, in a case in which a full thickness specimen is subjected to a pipe axis direction tensile test, a ratio of yield strength to tensile strength is 80% or more, and yield elongation is exhibited.

<5> The steel pipe according to any one of <1> to <4>, in which the steel pipe is an electric resistance welded steel pipe.

Advantageous Effects of Invention

According to the invention, a steel pipe having excellent internal pressure fatigue resistance properties can be provided.

BRIEF DESCRIPTION OF DRAWINGS

FIG. 1 is a graph illustrating a relationship between outer surface residual stress of a steel pipe and the number of cycles required to fracture the steel pipe at an applied stress of 400 MPa.

DESCRIPTION OF EMBODIMENTS

Herein, compressive residual stress may be expressed as a negative (−) residual stress while tensile residual stress may be expressed as a positive (+) residual stress. Namely, "compressive residual stress is high" herein means that the residual stress is a negative value, and that the absolute value of the residual stress is high. For example, "compressive residual stress of 250 MPa or more" is synonymous with "residual stress of −250 MPa or less".

"Residual stress is high" herein means that the absolute value of a residual stress is high.

"Compressive residual stress" and "residual stress" herein refer to compressive residual stress measured by an X-ray method, and residual stress measured by the X-ray method, respectively, unless otherwise specified.

A numerical range expressed by "x to y" herein includes the values of x and y in the range as the minimum and maximum values, respectively.

A steel pipe of the invention will be described in detail below.

The steel pipe of the invention contains in terms of mass %: from 0.06% to 0.25% of C, 0.50% or less of Si, from 1.00% to 1.80% of Mn, 0.030% or less of P, 0.020% or less of S, 0.08% or less of Al, 0.008% or less of N, 0.080% or less of Nb, and a remainder consisting of Fe and unavoidable impurities, in which a compressive residual stress at an outer surface measured by an X-ray method is 250 MPa or more, and a compressive residual stress at a position at a depth of 1 mm from the outer surface measured by the X-ray method is 70% or more of the compressive residual stress at the outer surface measured by the X-ray method.

Herein, the ratio (%) of the compressive residual stress at a position at a depth of 1 mm from the outer surface to the compressive residual stress at the outer surface is defined as ratio C. Namely, the ratio C is defined by the following Formula 1.

In the invention, the ratio C is 70% or more.

Ratio $C(\%)$=(compressive residual stress at a position at a depth of 1 mm from the outer surface/ compressive residual stress at the outer surface)×100    Formula 1:

In the steel pipe of the invention, strength as a base for improving the internal pressure fatigue resistance properties can be secured by having the above-described composition as the composition of the steel pipe. The composition of the steel pipe of the invention will be described below.

The compressive residual stress at the outer surface (outer peripheral surface) of the steel pipe of the invention, and the ratio C of the steel pipe are set in the above-described ranges, in addition to having the above-described composition as the composition of the steel pipe. As a result, internal pressure fatigue fractures originating from a flaw imparted from the outside are inhibited.

Based on the above, such internal pressure fatigue resistance properties are improved by the steel pipe of the invention.

In a case in which the residual stress at the outer surface of a steel pipe is compressive residual stress, the residual stress at the inner surface of the steel pipe generally tends to be tensile residual stress in order to maintain a balance between the residual stresses at the outer surface (outer peripheral surface) and the inner surface (inner peripheral surface). Thus, the tensile residual stress at the inner surface tends to increase in conjunction with an increase in the compressive residual stress at the outer surface.

However, the residual stress (absolute value) at the inner surface of the steel pipe is reduced compared with that at the outer surface, depending on the wall thickness of the steel pipe. Such a tendency is more remarkable in the case of satisfying at least one of a wall thickness of 7 mm or more, or a ratio [wall thickness/outer diameter] of 0.07 or more. Moreover, it is more difficult to impart a flaw to the inner surface of the steel pipe than to the outer surface of the steel pipe.

For such reasons, an internal pressure fatigue fracture originating from a flaw imparted in the inner surface is not significantly problematic even in a case in which the compressive residual stress at the outer surface is increased as described above.

Therefore, in order to improve the internal pressure fatigue resistance properties of the steel pipe, a countermeasure against an internal pressure fatigue fracture originating from a flaw imparted to the outer surface is more important than a countermeasure against an internal pressure fatigue fracture originating from a flaw imparted to the inner surface.

In the invention, the compressive residual stress at the outer surface is 250 MPa or more. As a result, internal pressure fatigue fractures originating from a flaw imparted from the outside are inhibited.

The compressive residual stress at the outer surface is preferably 350 MPa or more, and more preferably 400 MPa or more.

The upper limit of the compressive residual stress at the outer surface is not particularly restricted. From the viewpoint of further reducing the tensile residual stress at the inner surface, the compressive residual stress at the outer surface is preferably 600 MPa or less.

A compressive residual stress of 250 MPa according to an X-ray method is equivalent to a compressive residual stress of 150 MPa according to a Crampton method, a compressive residual stress of 430 MPa according to the X-ray method is equivalent to a compressive residual stress of 300 MPa according to the Crampton method, and a tensile residual stress of 120 MPa according to the X-ray method is equivalent to a tensile residual stress of 100 MPa according to the Crampton method.

Measurement of the compressive residual stress by the X-ray method can be performed according to a usual method. An example of the measurement method is described in the Examples below.

In the invention, the ratio C is 70% or more as described above.

As a result, internal pressure fatigue fractures originating from a flaw imparted from the outside are inhibited.

In particular, this kind of internal pressure fatigue fracture can be inhibited even in a case in which the outer surface is peeled for any reason, or in a case in which a flaw having a depth from the outer surface to the inside is imparted.

The ratio C is preferably 80% or more, and more preferably 90% or more.

In theory, the upper limit of the ratio C is 100%. However, the ratio C may be more than 100% in a case, for example, in which a measurement position at the outer surface and a measurement position located at a depth of 1 mm are different from each other in an axial or circumferential direction.

The effect of improvement in internal pressure fatigue resistance properties by the invention can be evaluated, for example, based on the number of cycles required for fracture at an applied stress of 400 MPa in the circumferential direction of the steel pipe. It goes without saying that a greater number of cycles required for fracture means superior internal pressure fatigue resistance properties.

FIG. 1 is a graph illustrating a relationship between outer surface residual stress of a steel pipe and the number of cycles required to fracture the steel pipe at an applied stress of 400 MPa.

In the measurement of the graph, first, nine steel pipes (nine electric resistance welded steel pipes) having the composition of Steel No. 2, which is described below, and having residual stresses at outer surfaces according to an X-ray method ("OUTER SURFACE RESIDUAL STRESSES" in FIG. 1) that are the values indicated in FIG. 1, were prepared. The residual stresses at the outer surfaces were varied by changing the conditions of heat treatment in the Examples described below. The residual stresses at the outer surfaces in the X-ray method were measured by a method described in the Examples below.

Then, a stress of 400 MPa was repeatedly applied onto each of the nine steel pipes described above at a frequency of 0.8 Hz in a circumferential direction, and the number of cycles (times) of the stress until each steel pipe was fractured was determined. The obtained number (times) of the cycles was regarded as "THE NUMBER OF CYCLES TO FRACTURE AT APPLIED STRESS OF 400 MPa [TIMES]" in FIG. 1. The number of cycles was measured under the condition that the steel pipe temperature was an ordinary temperature (about 20° C.).

As illustrated in FIG. 1, a residual stress of −250 MPa or less (i.e., a compressive residual stress of 250 MPa or more) at the outer surface was found to result in a remarkable increase in the number (times) of cycles to fracture; that is, in remarkable improvement in the internal pressure fatigue resistance properties of the steel pipe.

The wall thickness of the steel pipe of the invention is preferably from 7 mm to 17 mm.

A wall thickness of 7 mm or more results in a greater improvement in resistance to internal pressure. Because residual stress at the inner surface can be reduced due to the increased wall thickness, an internal pressure fatigue fracture originating from a flaw imparted to the inner surface is further inhibited.

An upper limit of the wall thickness of 17 mm is an upper limit set in consideration of formability for bending a hot rolled steel sheet to form a steel pipe (in particular, formability in a case in which the steel pipe of the invention is an electric resistance welded steel pipe).

In the steel pipe of the invention, the ratio of the wall thickness to the outer diameter (wall thickness/outer diameter) is preferably from 0.07 to 0.12.

A ratio (wall thickness/outer diameter) of 0.07 or more results in a greater improvement in resistance to internal pressure. Because the residual stress at the inner surface can be reduced, an internal pressure fatigue fracture originating from a flaw imparted to the inner surface is further inhibited.

An upper limit of the ratio (wall thickness/outer diameter) of 0.12 is an upper limit set in consideration of formability for bending a hot rolled steel sheet to form a steel pipe (in particular, formability in a case in which the steel pipe of the invention is an electric resistance welded steel pipe).

The steel pipe of the invention particularly preferably has a wall thickness of from 7 mm to 17 mm, and a ratio (wall thickness/outer diameter) of from 0.07 to 0.12.

Herein, the outer diameter, the wall thickness, and the ratio (wall thickness/outer diameter) may be referred to as "outer diameter D", "wall thickness t", and "ratio [t/D]", respectively.

In view of further improving the internal pressure fatigue resistance properties, the steel pipe of the invention preferably has a ratio of yield strength to tensile strength (hereinafter also referred to as "yield ratio") of 80% or more, and yield elongation is exhibited, in a case in which a full thickness specimen is subjected to a pipe axis direction tensile test.

The properties of a yield ratio of 80% or more, and of the presence of yield elongation, are properties peculiar to a steel pipe subjected to the heat treatment described below.

A yield ratio of 80% or more can result in a wider elastic region. Fractures are inhibited even with internal pressure fatigue in a case in which yield elongation is exhibited. In theory, the upper limit of the yield ratio is 100%.

The kind of the steel pipe of the invention is not particularly restricted, and may be a welded steel pipe such as an electric resistance welded steel pipe, or may be a seamless steel pipe.

It is preferable that the steel pipe of the invention is an electric resistance welded steel pipe from the viewpoint of dimensional accuracy, manufacturing costs, and the like.

The steel pipe of the invention (in particular, a steel pipe having a yield ratio of 80% or more, and exhibiting yield elongation, in a case in which a full thickness specimen is subjected to a pipe axis direction tensile test) can be produced, for example, by heating the whole of a steel pipe that has not yet been subjected to heat treatment after pipe making (hereinafter also referred to as a "steel pipe as-rolled") to a temperature of not more than an Ac1 point, and by quenching the outer surface of the heated steel pipe. Herein, a process from the start of the heating to the end (stop) of the cooling may be referred to as "heat treatment".

It is thought that the quenching can cause the difference between the temperatures of the outer surface and the inner surface, and the difference between the temperatures can cause a large compressive residual stress at the outer surface. The effect due to the quenching can be more effectively exerted in the case of satisfying at least one of a wall thickness of 7 mm or more, or a ratio (wall thickness/outer diameter) of 0.07 or more.

The outer surface can be quenched, for example, by spraying a cooling solvent from the vicinity of the outer surface onto the outer surface by a spray nozzle or the like. In such a case, the compressive residual stress at the outer surface and a ratio C can be adjusted by adjusting the heat treatment temperature, the cooling starting temperature, the cooling rate, or the like. For example, the compressive residual stress at the outer surface tends to increase with an increase in the cooling rate.

The steel pipe after pipe making and before heating (steel pipe as-rolled) may also be subjected to other processes such as cold drawing.

The use of the steel pipe of the invention is not particularly restricted. The steel pipe of the invention can be used in any application requiring excellent internal pressure fatigue resistance properties.

Examples of the steel pipe of the invention include a steel pipe for a cylinder, a steel pipe for a vibration control damper, a steel pipe for an earthquake-resistant damper, and hydraulic piping.

In particular, improvement in the internal pressure fatigue resistance properties is of great significance in a case in which the steel pipe of the invention is a steel pipe for cylinder use.

The steel pipe for a cylinder is preferably a steel pipe for a cylinder which is applied to the outer cover of a cylinder that extends and contracts due to oil pressure or the like. Examples of such a cylinder include cylinders in the vicinity of driving systems, such as the buckets, arms, and booms of hydraulic shovels.

The composition of the steel pipe of the invention will be described below.

"%" expressing the content of an element in a steel pipe is "mass %" in the following.

Further, when simply the term "content" is used for the respective elements, this refers to the content in a steel pipe.

The steel pipe of the invention contains from 0.06% to 0.25% of C, 0.50% or less of Si, from 1.00% to 1.80% of Mn, 0.030% or less of P, 0.020% or less of S, 0.08% or less of Al, 0.008% or less of N, and 0.080% or less of Nb, and a remainder consisting of Fe and unavoidable impurities, as described above.

Each element and its content, and the unavoidable impurities, will be described below.

<C: 0.06% to 0.25%>

C (carbon) is an element that is effective for improving the strength of a steel pipe.

The content of C in the steel pipe of the invention is 0.06% or more. As a result, the strength of the steel pipe can be secured as a base for improving the internal pressure fatigue resistance properties.

An excessively high content of C results in excessively high strength of the steel pipe, and in deterioration in toughness. Thus, the upper limit of the content of C is 0.25%.

<Si: 0.50% or Less>

Si (silicon) is effective as a deoxidizer.

However, an excessively high content of Si results in deterioration of low-temperature toughness, and further, in deterioration of electric resistance weldability in a case in which the steel pipe of the invention is an electric resistance welded steel pipe. Thus, the upper limit of the content of Si is 0.50%. The content of Si is preferably 0.40% or less, and more preferably 0.30% or less.

The content of Si is preferably 0.01% or more in view of being able to more effectively achieve an effect as a deoxidizer. The content of Si is preferably 0.05% or more, and more preferably 0.10% or more, in view of further increasing the strength of the steel pipe by solid solution strengthening.

Si may not only be contained intentionally in steel, but Si may also be mixed as an impurity into steel. The lower limit of the content of Si is not particularly restricted because a lower content of Si is preferable in a case in which Si is mixed as an impurity into steel.

<Mn: 1.00% to 1.80%>

Mn (manganese) is an element that enhances the hardenability of steel, thereby allowing the steel to have high strength.

The content of Mn (manganese) in the steel pipe of the invention is 1.00% or more in view of securing high strength. The content of Mn is preferably 1.10% or more, and more preferably 1.20% or more.

However, an excessively high content of Mn promotes the generation of martensite, and in deterioration in toughness. Thus, the upper limit of the content of Mn is 1.80%.

<P: 0.030% or Less>

P (phosphorus) is an impurity.

The upper limit of the content of P is 0.030% because toughness is improved by reducing the content of P. The content of P is preferably 0.018% or less.

The lower limit of the content of P is not particularly restricted because a lower content of P is preferable. However, the content of P is ordinarily 0.001% or more from the viewpoint of balancing properties and costs.

<S: 0.020% or Less>

S (sulfur) is an impurity.

The upper limit of the content of S is 0.020% because reduction of the content of S enables MnS elongated by hot rolling to be reduced, and toughness to be improved. The content of S is preferably 0.008% or less, and more preferably 0.005% or less.

The lower limit of the content of S is not particularly restricted because a lower content of S is preferable. However, the content of S is ordinarily 0.0001% or more from the viewpoint of balancing properties and costs.

<Al: 0.08% or Less>

Al (aluminum) is an element that is effective as a deoxidizer.

However, an excessively high content of Al results in an increase in inclusions, and in deterioration of ductility and toughness. Thus, the upper limit of the content of Al is 0.08%.

The content of Al is preferably 0.001% or more, more preferably 0.005% or more, and particularly preferably 0.01% or more, in view of more effectively obtaining an effect as a deoxidizer.

Al may not only be contained intentionally in steel, but Al may also be mixed as an impurity into steel. The lower limit of the content of Al is not particularly restricted because a lower content of Al is preferable in a case in which Al is mixed as an impurity into steel.

<N: 0.008% or Less>

N (nitrogen) is an element that unavoidably exists in steel.

However, an excessively high content of N results in an excessive increase in inclusions such as AlN, whereby an adverse effect such as a surface flaw or deterioration in toughness may be caused. Thus, the upper limit of the content of N is 0.008%. The content of N is preferably 0.007% or less, and particularly preferably 0.006% or less.

The lower limit of the content of N is not particularly restricted, and the content of N is preferably 0.002% or more in consideration of the cost and economical efficiency of N removal (denitration).

<Nb: 0.080% or Less>

Nb (niobium) is an element which lowers the recrystallization temperature, and which inhibits recrystallization of austenite during hot rolling, thereby contributing to refinement of the structure.

However, an excessively high content of Nb results in deterioration in toughness due to coarse precipitates. Thus, the upper limit of the content of Nb is 0.080%. The content of Nb is preferably 0.070% or less, and more preferably 0.050% or less.

The content of Nb is preferably 0.008% or more, more preferably 0.010% or more, and particularly preferably 0.015% or more, in view of more reliably obtaining a structure refinement effect.

<Unavoidable Impurities>

In the invention, an unavoidable impurity means a component contained in a source material or a component mixed into steel in a production process, and is not a component that is intentionally included in the steel.

Specific examples of unavoidable impurities include O (oxygen), Sb (antimony), Sn (tin), W (tungsten), Co (cobalt), As (arsenic), Mg (magnesium), Pb (lead), Bi (bismuth), B (boron), and H (hydrogen).

Among these, O is preferably controlled to have a content of 0.006% or less.

Ordinarily, for other elements, it is possible to allow inclusion of a content of 0.1% or less of Sb, Sn, W, Co, or As, a content of 0.005% or less of Mg, Pb, or Bi, and a content of 0.0004% or less of B or H; however, with respect to any other elements, no particular control is required insofar as the content is within an ordinary range.

The steel pipe of the invention may further selectively contain one or more of 0.080% or less of V, 0.030% or less of Ti, 0.50% or less of Cu, 0.50% or less of Ni, 0.50% or less of Cr, 0.50% or less of Mo, 0.0040% or less of B, 0.005% or less of Ca, and 0.005% or less of REM.

These elements may be mixed into the steel as unavoidable impurities in cases other than which they are intentionally included in the steel. Therefore, the lower limits of the contents of the elements are not particularly restricted.

These elements, and the preferred contents of the elements contained in the steel pipe of the invention will be described below.

<V: 0.080% or Less>

V (vanadium) is an element that generates a carbide and a nitride, and improves the strength of steel by precipitation strengthening.

However, an excessively high content of V causes the carbide and the nitride to be coarsened, whereby toughness may be deteriorated. Thus, the content of V is preferably 0.080% or less, and more preferably 0.060% or less.

The content of V is preferably 0.010% or more in view of further improving the strength of the steel pipe.

<Ti: 0.030% or Less>

Ti (titanium) is an element that forms a refined nitride (TiN), and inhibits an austenite grain from coarsening during the heating of a slab, thereby contributing to refinement of the structure.

However, an excessively high content of Ti results in coarsening of TiN, or in precipitation hardening due to TiC, whereby toughness may be deteriorated. Thus, the content of Ti is preferably 0.030% or less, more preferably 0.025% or less, and particularly preferably 0.020% or less.

The content of Ti is preferably 0.008% or more, and more preferably 0.010% or more, from the viewpoint of further improving toughness by refining the structure.

<Cu: 0.50% or Less>

Cu (copper) is an element that enhances the hardenability of steel, thereby allowing the steel to have high strength. Cu is also an element that contributes to solid solution strengthening.

However, an excessively high content of Cu may result in deterioration of the surface quality of the steel pipe. Thus, the content of Cu is preferably 0.50% or less, and more preferably 0.30% or less.

The content of Cu is preferably 0.05% or more.

In a case in which the steel pipe contains Cu, it is preferable that the steel pipe also contains Ni from the viewpoint of preventing the surface quality from deteriorating.

<Ni: 0.50% or Less>

Ni (nickel) is an element that enhances the hardenability of steel, thereby allowing the steel to have high strength. Ni is also an element that contributes to increased toughness. However, since Ni is an expensive element, the content of Ni is preferably 0.50% or less, and more preferably 0.30% or less, in view of economical efficiency.

The content of Ni is preferably 0.05% or more from the viewpoint of further improving toughness.

<Cr: 0.50% or Less>

Cr (chromium) is an element that is effective for improving strength.

However, since an excessively high content of Cr may result in deterioration of electric resistance weldability, the content of Cr is preferably 0.50% or less, and more preferably 0.20% or less.

The content of Cr is preferably 0.05% or more in view of further improving the strength of the steel pipe.

<Mo: 0.50% or Less>

Mo (molybdenum) is an element that contributes to higher strength of steel.

However, since Mo is an expensive element, the content of Mo is preferably 0.50% or less, more preferably 0.30% or less, and particularly preferably 0.10% or less, in view of economical efficiency.

The content of Mo is preferably 0.05% or more.

<B: 0.0040% or Less>

B (boron) is an element of which even a minute content results in remarkable enhancement of the hardenability of steel, thereby contributing to higher strength of the steel.

However, since the hardenability is not further improved, and moreover, precipitates may be generated, thereby reducing toughness, in a case in which the content of B is more than 0.0040%, the upper limit of the content of B is preferably 0.0040%. Although B may be mixed from raw material impurities, a B content of 0.0004% or more is preferable in order to sufficiently obtain the effect of hardenability.

<Ca: 0.005% or Less>

Ca (calcium) is an element that controls the form of sulfide-based inclusions, improves low-temperature toughness, and further refines oxides in an electric resistance weld, thereby improving the toughness of the electric resistance weld.

However, an excessively high content of Ca results in an increased size of oxides or sulfides, whereby toughness may be adversely affected. Thus, the content of Ca is preferably 0.005% or less.

The content of Ca is preferably 0.001% or more.

<REM: 0.005% or Less>

"REM" herein means a rare earth element, and is the general term for the 17 elements Sc (scandium), Y (yttrium), La (lanthanum), Ce (cerium), Pr (praseodymium), Nd (neodymium), Pm (promethium), Sm (samarium), Eu (europium), Gd (gadolinium), Tb (terbium), Dy (dysprosium), Ho (holmium), Er (erbium), Tm (thulium), Yb (ytterbium), and Lu (lutetium).

"REM: 0.005% or less" means that at least one of the 17 elements is contained, and the total content of the 17 elements is 0.005% or less.

REM is an element that controls the form of sulfide-based inclusions, improves low-temperature toughness, and further refines oxides in an electric resistance weld, thereby improving the toughness of the electric resistance weld.

However, an excessively high content of REM results in increased size of oxides or sulfides, whereby toughness may be adversely affected. Thus, the content of REM is preferably 0.005% or less.

The content of REM is preferably 0.001% or more.

EXAMPLES

The invention will be still more specifically described with Examples, provided that the invention is not limited to the following Examples.

Examples 1 to 16, and Comparative Examples 1 to 5

Electric resistance welded steel pipes (electric resistance welded steel pipes as-rolled) having the compositions set forth in "Steel No. 1 to No. 5" in the following Table 1, and the outer diameters D, wall thicknesses t, and ratios [t/D] set forth in the following Table 2 were prepared.

In the compositions of the electric resistance welded steel pipes, components (remainder) other than the elements set forth in Table 1 were Fe (iron) and unavoidable impurities.

"REM" in Steel No. 5 is specifically La (lanthanum).

A heat treatment apparatus sequentially including a heating furnace, a soaking furnace, and a rapid water-cooling apparatus, was prepared.

The heat treatment apparatus is configured such that a steel pipe to be heat-treated is transported along the pipe axis direction of the steel pipe, and the steel pipe is sequentially passed through the heating furnace, the soaking furnace, and the rapid water-cooling apparatus.

The rapid water-cooling apparatus includes a spray nozzle for spraying cooling water from the periphery of the outer surface (outer peripheral surface) of the steel pipe over the entire outer surface.

In the heat treatment apparatus, a radiation thermometer A for measuring the cooling start temperature of the steel pipe is included between the soaking furnace and the rapid water-cooling apparatus, and a radiation thermometer B for measuring the cooling stop temperature of the steel pipe is included at a downstream side in the direction of transporting the steel pipe viewed from the rapid water-cooling apparatus.

The soaking furnace includes a thermocouple for measuring the temperature of the atmosphere in the furnace.

<Heat Treatment>

The electric resistance welded steel pipes were subjected to heat treatment (heating and quenching) by sequentially passing the electric resistance welded steel pipes through the heating furnace, soaking furnace, and rapid water-cooling apparatus of the heat treatment apparatus. The heating temperatures, cooling start temperatures, cooling rates, and cooling stop temperatures here are as set forth in the following Table 2. In the Examples, "heat treatment" refers to a process from the start of heating to the stop of cooling.

The heating temperatures were measured by the thermocouple included in the soaking furnace, the cooling start temperatures were measured by the radiation thermometer A included between the soaking furnace and the rapid water-cooling apparatus, and the cooling stop temperatures were measured by the radiation thermometer B included at the downstream side in the direction of transporting the steel pipes viewed from the rapid water-cooling apparatus. The respective cooling rates were calculated based on the respective cooling start temperatures, cooling stop temperatures, distances between the radiation thermometer A and the radiation thermometer B, and speeds of transporting the steel pipes.

<Measurement of Residual Stress>

The residual stresses of the electric resistance welded steel pipes subjected to the heat treatment were measured by an X-ray method.

The residual stresses were measured at a position at a depth of 1 mm from the outer surfaces, and at the outer surfaces.

Based on the measurement results, each ratio C (i.e., ratio (%) of compressive residual stress at a position at a depth of 1 mm from the outer surface to compressive residual stress measured by X-ray method at the outer surface) was determined according to Formula 1.

The results are set forth in the following Table 2.

The conditions of the measurement of such residual stress by the X-ray method are as follows.

—Conditions of Measurement of Residual Stress by X-Ray Method—

In measurement of residual stress by an X-ray method, a shorter length of a sample may result in a reduced residual stress. Thus, it is preferable to secure a length for each sample used in the measurement that is 1.5 times the outer diameter of the sample or more. Therefore, samples (electric resistance welded steel pipes) each having a length of 400 mm were prepared in the measurement.

The measurement of residual stress by the X-ray method was performed by a gradient method using a microfocus X-ray stress measurement device. The position of the measurement was set at a middle position in the lengthwise direction of each sample.

With regard to the residual stresses at the outer surfaces, the residual stresses at the outer surfaces of the samples were measured by the above-described method.

With regard to the residual stress at a position at a depth of 1 mm from each outer surface, a recess having a depth of 1 mm from the outer surface was formed by subjecting each of the samples to electrolytic polishing, and the residual stress at the bottom of the recess (i.e., the position at a depth of 1 mm from the outer surface) was measured by the above-described method.

<Pipe Axis Direction Tensile Test>

A full thickness specimen was sampled from each electric resistance welded steel pipe subjected to the heat treatment. The full thickness specimen was subjected to a pipe axis direction tensile test, whereby the yield strength YS and tensile strength TS of the full thickness specimen were measured. In the test, the presence or absence of yield elongation was further confirmed. A yield ratio YR was further determined as the ratio (%) of the yield strength YS to the tensile strength TS.

The above results are set forth in the following Table 2.

The pipe axis direction tensile test was conducted in conformity with JIS Z2241 (2011). The tensile direction of the specimen was set as the pipe axis direction.

The shape of the full thickness specimen was set as the shape of Specimen No. 12.

TABLE 1

| Steel No. | Content (mass %) | | | | | | | | | | | | | | | |
|---|---|---|---|---|---|---|---|---|---|---|---|---|---|---|---|---|
| | C | Si | Mn | P | S | Al | N | Nb | V | Ti | Cu | Ni | Cr | Mo | B | Ca | REM |
| 1 | 0.08 | 0.26 | 1.34 | 0.015 | 0.004 | 0.02 | 0.003 | 0.047 | 0.016 | — | — | — | — | — | — | 0.001 | — |
| 2 | 0.09 | 0.21 | 1.16 | 0.014 | 0.004 | 0.02 | 0.003 | 0.030 | — | — | — | — | — | — | — | — | — |
| 3 | 0.20 | 0.23 | 1.50 | 0.012 | 0.003 | 0.03 | 0.004 | 0.047 | 0.054 | 0.015 | — | — | — | — | — | 0.001 | — |
| 4 | 0.11 | 0.21 | 1.28 | 0.014 | 0.004 | 0.02 | 0.003 | 0.030 | — | — | 0.30 | 0.16 | — | — | — | — | — |
| 5 | 0.06 | 0.23 | 1.64 | 0.012 | 0.003 | 0.03 | 0.004 | 0.047 | 0.054 | 0.015 | — | — | 0.12 | 0.08 | 0.0012 | 0.001 | 0.001 |

TABLE 2

| | Electric resistance welded steel pipe | | | | Heat treatment conditions | | | | |
|---|---|---|---|---|---|---|---|---|---|
| | Steel No. | Outer diameter D (mm) | Wall thickness t (mm) | Ratio [t/D] | Heating temperature (° C.) | Cooling/not cooling | Cooling start temperature (° C.) | Cooling rate (° C./s) | Cooling stop temperature (° C.) |
| Comparative Example 1 | 1 | 140 | 10 | 0.07 | 600 | Not cooling (Natural cooling) | — | — | — |
| Comparative Example 2 | 2 | 150 | 12 | 0.08 | 550 | Not cooling (Natural cooling) | — | — | — |
| Comparative Example 3 | 2 | 140 | 12 | 0.09 | 350 | Cooling | 300 | 30 | 25 |
| Comparative Example 4 | 2 | 190 | 6 | 0.03 | 550 | Cooling | 500 | 40 | 25 |
| Comparative Example 5 | 2 | 190 | 10 | 0.05 | 650 | Cooling | 600 | 40 | 25 |
| Example 1 | 1 | 140 | 10 | 0.07 | 550 | Cooling | 500 | 40 | 25 |
| Example 2 | 1 | 140 | 10 | 0.07 | 650 | Cooling | 600 | 35 | 25 |
| Example 3 | 1 | 170 | 12.5 | 0.07 | 550 | Cooling | 500 | 40 | 25 |
| Example 4 | 1 | 170 | 12.5 | 0.07 | 650 | Cooling | 600 | 35 | 25 |
| Example 5 | 2 | 140 | 12 | 0.09 | 550 | Cooling | 500 | 40 | 25 |
| Example 6 | 2 | 140 | 12 | 0.09 | 650 | Cooling | 600 | 35 | 25 |
| Example 7 | 2 | 150 | 16 | 0.11 | 550 | Cooling | 500 | 40 | 25 |
| Example 8 | 2 | 150 | 16 | 0.11 | 650 | Cooling | 600 | 35 | 25 |
| Example 9 | 3 | 140 | 10 | 0.07 | 550 | Cooling | 500 | 40 | 25 |
| Example 10 | 3 | 140 | 10 | 0.07 | 650 | Cooling | 600 | 35 | 25 |
| Example 11 | 3 | 160 | 12 | 0.08 | 550 | Cooling | 500 | 40 | 25 |
| Example 12 | 3 | 160 | 12 | 0.08 | 650 | Cooling | 600 | 35 | 25 |
| Example 13 | 4 | 170 | 12.5 | 0.07 | 550 | Cooling | 500 | 40 | 25 |
| Example 14 | 4 | 150 | 16 | 0.11 | 600 | Cooling | 550 | 40 | 25 |
| Example 15 | 5 | 170 | 12.5 | 0.07 | 650 | Cooling | 600 | 35 | 25 |
| Example 16 | 5 | 140 | 12 | 0.09 | 650 | Cooling | 600 | 35 | 25 |

| | Residual stress measurement results | | | Pipe axis direction tensile test results | | | |
|---|---|---|---|---|---|---|---|
| | Position at depth of 1 mm from outer surface (MPa) | Outer surface (MPa) | Ratio C (%) | YS (MPa) | TS (MPa) | YR (%) | Presence or absence of yield elongation |
| Comparative Example 1 | 50 | 50 | 100 | 552 | 600 | 92 | Present |
| Comparative Example 2 | 120 | 120 | 100 | 521 | 560 | 93 | Present |
| Comparative Example 3 | 100 | 100 | 100 | 540 | 562 | 96 | Absent |
| Comparative Example 4 | −100 | −180 | 56 | 531 | 571 | 93 | Present |
| Comparative Example 5 | −150 | −250 | 60 | 519 | 558 | 93 | Present |
| Example 1 | −360 | −370 | 97 | 555 | 603 | 92 | Present |
| Example 2 | −450 | −460 | 98 | 552 | 600 | 92 | Present |
| Example 3 | −390 | −390 | 100 | 561 | 610 | 92 | Present |
| Example 4 | −480 | −490 | 98 | 551 | 599 | 92 | Present |
| Example 5 | −340 | −350 | 97 | 521 | 560 | 93 | Present |
| Example 6 | −380 | −400 | 95 | 521 | 560 | 93 | Present |
| Example 7 | −350 | −360 | 97 | 513 | 552 | 93 | Present |
| Example 8 | −400 | −410 | 98 | 512 | 550 | 93 | Present |
| Example 9 | −400 | −410 | 98 | 680 | 782 | 87 | Present |
| Example 10 | −490 | −490 | 100 | 679 | 780 | 87 | Present |
| Example 11 | −430 | −440 | 98 | 684 | 786 | 87 | Present |
| Example 12 | −520 | −510 | 102 | 679 | 781 | 87 | Present |
| Example 13 | −400 | −440 | 91 | 580 | 630 | 92 | Present |
| Example 14 | −420 | −430 | 98 | 595 | 640 | 93 | Present |
| Example 15 | −480 | −480 | 100 | 722 | 785 | 92 | Present |
| Example 16 | −430 | −510 | 84 | 735 | 790 | 93 | Present |

As set forth in Table 2, the electric resistance welded steel pipes of Examples 1 to 16 each had a residual stress at the outer surface of −250 MPa or less (i.e., compressive residual stress at the outer surface of 250 MPa or more), and a ratio C (ratio of compressive residual stress at a position at depth of 1 mm from the outer surface to compressive residual stress at the outer surface) of 70% or more.

In the pipe axis direction tensile test, the electric resistance welded steel pipes of Examples 1 to 16 each had a yield ratio YR of 80% or more and each exhibited yield elongation.

Based on the above, the electric resistance welded steel pipes of Examples 1 to 16 are found to have excellent internal pressure fatigue resistance properties.

Then, a comparative sample A obtained not by subjecting the electric resistance welded steel pipe as-rolled in Example 5 to the heat treatment described above, but by subjecting the outer surface of the electric resistance welded steel pipe as-rolled to shot blasting working (ejection pressure: 0.8 MPa, grinding/polishing material: 1.0 mm diameter steel ball, working temperature: room temperature, and coverage: 100%) was prepared.

Measurement of the residual stresses of the comparative sample A by the above-described method revealed that the residual stress at the outer surface was −300 MPa, and the residual stress at a depth of 1 mm from the outer surface was +100 MPa.

A comparison sample B obtained not by subjecting the electric resistance welded steel pipe as-rolled in Example 5 to the heat treatment described above, but by subjecting the outer surface of the electric resistance welded steel pipe to burnishing working was further prepared.

Measurement of the residual stresses of the comparative sample B by the above-described method revealed that the residual stress at the outer surface was −100 MPa, and the residual stress at a depth of 1 mm from the outer surface was +100 MPa.

All documents, patent applications, and technical standards described in this specification are herein incorporated by reference to the same extent as if each individual document, patent application, or technical standard was specifically and individually indicated to be incorporated by reference.

The invention claimed is:

1. A steel pipe, consisting of, in terms of mass %:
0.06% to 0.25% of C,
0.50% or less of Si,
1.00% to 1.80% of Mn,
0.030% or less of P,
0.020% or less of S,
0.08% or less of Al,
0.008% or less of N,
0.080% or less of Nb, and
a remainder consisting of Fe and unavoidable impurities,
wherein a compressive residual stress at an outer surface measured by an X-ray method is 250 MPa or more,
a compressive residual stress at a position at a depth of 1 mm from the outer surface measured by the X-ray method is 70% or more of the compressive residual stress at the outer surface measured by the X-ray method, and
having a wall thickness of from 7 mm to 17 mm, wherein a ratio of the wall thickness to an outer diameter (wall thickness/outer diameter) is from 0.07 to 0.12.

2. A steel pipe, consisting of, in terms of mass %:
0.06% to 0.25% of C,
0.50% or less of Si,
1.00% to 1.80% of Mn,
0.030% or less of P,
0.020% or less of S,
0.08% or less of Al,
0.008% or less of N,
0.080% or less of Nb,
0.080% or less of V,
0.030% or less of Ti,
0.50% or less of Cu,
0.50% or less of Ni,
0.50% or less of Cr,
0.50% or less of Mo,
0.0040% or less of B,
0.005% or less of Ca,
0.005% or less of REM and
a remainder consisting of Fe and unavoidable impurities,
wherein a compressive residual stress at an outer surface measured by an X-ray method is 250 MPa or more,
a compressive residual stress at a position at a depth of 1 mm from the outer surface measured by the X-ray method is 70% or more of the compressive residual stress at the outer surface measured by the X-ray method, and
having a wall thickness of from 7 mm to 17 mm, wherein a ratio of the wall thickness to an outer diameter (wall thickness/outer diameter) is from 0.07 to 0.12.

3. A steel pipe, comprising, in terms of mass %:
0.06% to 0.25% of C,
0.50% or less of Si,
1.00% to 1.80% of Mn,
0.030% or less of P,
0.020% or less of S,
0.08% or less of Al,
0.008% or less of N,
0.080% or less of Nb, and
a remainder comprising Fe and unavoidable impurities,
wherein a compressive residual stress at an outer surface measured by an X-ray method is 250 MPa or more,
a compressive residual stress at a position at a depth of 1 mm from the outer surface measured by the X-ray method is 70% or more of the compressive residual stress at the outer surface measured by the X-ray method, and
having a wall thickness of from 7 mm to 17 mm, wherein a ratio of the wall thickness to an outer diameter (wall thickness/outer diameter) is from 0.07 to 0.12.

4. The steel pipe according to claim 1, wherein, in a case in which a full thickness specimen is subjected to a pipe axis direction tensile test, a ratio of yield strength to tensile strength is 80% or more, and yield elongation is exhibited.

5. The steel pipe according to claim 1, wherein the steel pipe is an electric resistance welded steel pipe.

6. The steel pipe according to claim 1, wherein one or more of the following are satisfied:
Al: 0.001% to 0.08%,
N: 0.002% to 0.008%, or
Nb: 0.008% to 0.080%.

7. The steel pipe according to claim 2, wherein, in a case in which a full thickness specimen is subjected to a pipe axis direction tensile test, a ratio of yield strength to tensile strength is 80% or more, and yield elongation is exhibited.

8. The steel pipe according to claim 2, wherein the steel pipe is an electric resistance welded steel pipe.

9. The steel pipe according to claim 2, wherein one or more of the following are satisfied:
Al: 0.001% to 0.08%,
N: 0.002% to 0.008%, or
Nb: 0.008% to 0.080%.

10. The steel pipe according to claim 3, further comprising, in terms of mass %, one or more of:
0.080% or less of V,
0.030% or less of Ti,
0.50% or less of Cu,
0.50% or less of Ni,
0.50% or less of Cr,
0.50% or less of Mo,
0.0040% or less of B,
0.005% or less of Ca, or
0.005% or less of REM.

11. The steel pipe according to claim 3, wherein one or more of the following are satisfied:
0.001% to 0.08% of Al,
0.002% to 0.008% of N, or
0.008% to 0.080% of Nb.

12. The steel pipe according to claim 10, wherein one or more of the following are satisfied:
0.001% to 0.08% of Al,
0.002% to 0.008% of N, or
0.008% to 0.080% of Nb.

* * * * *